Sept. 21, 1965 G. G. MURPHY 3,207,846

FACSIMILE PHASING SYSTEM

Filed May 31, 1962

INVENTOR.
GERALD G. MURPHY
BY Edward P. Connors
Attorney

United States Patent Office 3,207,846

Patented Sept. 21, 1965

3,207,846

FACSIMILE PHASING SYSTEM

Gerald G. Murphy, Clifton, N.J., assignor to Hogan Faximile Corporation, New York, N.Y.

Filed May 31, 1962, Ser. No. 199,111
8 Claims. (Cl. 178—69.5)

The present invention relates to electric facsimile systems and more particularly to such systems including improved phasing means.

Electrical facsimile communication is the art in which graphic material such as pictures, drawings, printed or typed material, or the like, is scanned and the information converted into electric video signals which are used either locally or remotely to produce a "facsimile" of the original or "subject copy."

In a typical facsimile transmitter subject copy is continuously moved over a scanning area where it is illuminated. A reflected image of the subject copy is focussed on an image dissecting device or scanner by a lens system. The image dissecting device includes a fixed plate having a linear light transmitting slit and an adjacent rotatable disc having a spiral light transmitting slit positioned in the light path to photoelectric means. By the movement of the spiral slit past the linear slit an optical window is swept across the image of the copy as the copy is moved over the scanning area. The output of the photoelectric means is a series of trains of analogue type electric video signals. In order to provide phasing pulses or other signals, a so-called "backstroke interval" is positioned between each train of electric video signals.

In a typical facsimile receiver an electrolytic recording medium is continuously moved between a fixed linear electrode and a helical electrode which is usually carried on a rotatable drum. Suitable phasing mechanism is provided so that the copy is properly framed, that is, so that the received video signal for each line of scan is recorded starting at the left hand margin of the recording medium.

The typical transmitter produces a phasing pulse greater in magnitude than the video signal. At the receiver a local phasing pulse is generated as by the use of a commutator or by the use of a keyer switch actuated by rotation of the helix drum. Separated transmitted phasing pulses and the locally produced phasing pulses are compared in a coincidence gate, the output of which is used to control the phasing mechanism. Lock-out means is provided so that upon arriving at proper phase position the phasing mechanism is rendered inoperative until there is an appreciable interruption of phasing pulses.

It is desirable to use a lock-out mechanism because noise or minor interruptions of the video and phasing signals may start the phasing mechanism in operation, thereby causing a break in the recording until the recorder is again phased. An improper condition of lock-out is quite apt to occur at the start of a recording before the normal operating level of the system has been reached. In this case an exaggerated video signal pulse or noise might appear to the coincidence gate as a true transmitted pulse and thus cause the improper lock-out of the phasing mechanism with the attendant misframing of the recorded copy.

In accordance with the present invention a facsimile transmitter system is used including lock-out means at the receiver controlled by coincidence of the transmitted and the locally generated phasing pulses. In addition, means are included by which the level of the video signal is reduced at the start of the transmission and gradually raised so that while the system is being brought up towards operating level only the large magnitude phasing pulses are transmitted. As the transmission continues and the system approaches stabilization the modulation level is gradually raised so that video signals are also transmitted. Thus, lock-out of the phasing mechanism occurs in due course in proper phase position as proper coincidence is had between true phasing pulses.

The present invention aims to provide an improved facsimile system incorporating control means for the phasing mechanism responsive solely to coincidence of transmitted and locally generated phasing pulses.

Another object of the invention is to provide a facsimile system which is simple and economical in manufacture, efficient in operation and durable in use.

Other objects and advantages of the invention will be apparent from the following description and from the accompanying drawing which shows, by way of example, an embodiment of the invention.

Figure 1:
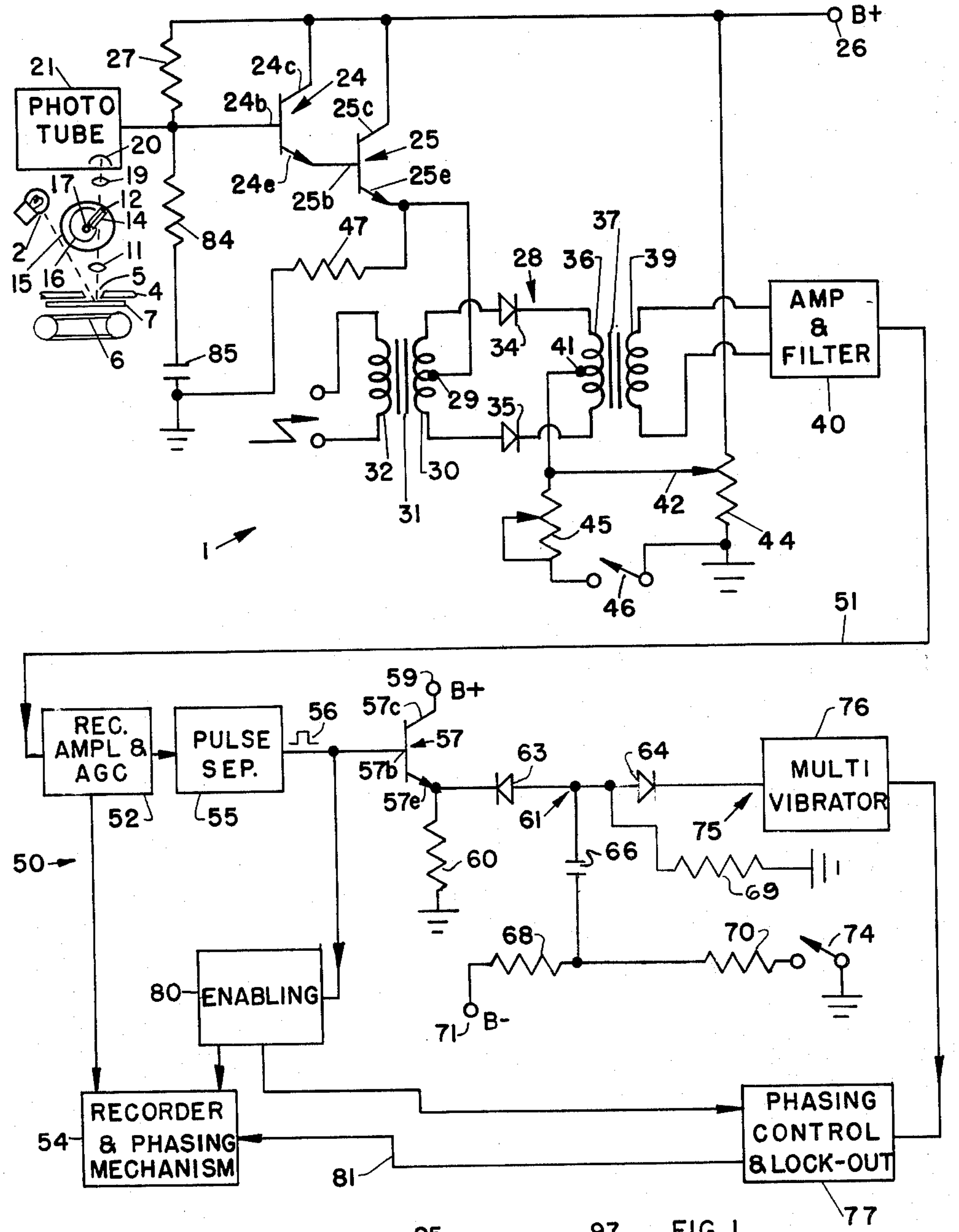
FIGURE 1 is a schematic drawing of the facsimile system in accordance with the invention.

In the transmitter 1 a light source 2 is directed to a scanning plate 4 having a scanning area or slot 5 and positioned over a moving belt 6. Copy 7 is carried by the belt 6 and moved past the scanning slot 5. Light reflected from the copy 7 is collected by a suitable lens 11 and focussed on a linear light transmitting slit 12 positioned in a plate 14. Closely positioned to the plate 14 is a disc 15 having a spiral light transmitting slit 16 thereon. The spiral 16 cooperates with the linear slit 12 to form an optical window which sweeps across the image as the disc 15 is rotated. The disc 15 is carried by a shaft 17 and rotated by a synchronous motor not shown. The light passed by the optical window is directed by a lens 19 to photosensitive surface 20 of photocell 21.

The output of the photocell 21 is connected to a semiconductor amplifier including transistors 24 and 25 connected in cascade. Each of the transistors includes a base, a collector and an emitter identified respectively as **24*b*, 24*c*, 24*e*, 25*b* and 25*e*. Collectors 24*c* and 25*c* receive their current supply from a power supply 26. The base 24*b* receives its bias from the power supply 26 through biasing resistor 27**.

A balanced modulator 28 is used to amplitude modulate a carrier for transmission. The output of emitter **25*e* is connected to midpoint 29 of winding 30 of the input transformer 31 of the modulator 28. A carrier winding 32** is connected to a suitable source of carrier frequency of the order of two to twelve kilocycles per second.

A pair of forward gating diodes 34 and 35 is connected between the outer legs of the winding 30 and the input legs of a primary winding 36 of an output transformer 37 which has its output winding 39 connected to a transmitter amplifier and filter 40 as is well known in the art. Midpoint 41 of the output transformer primary winding 36 is connected to tap 42 of a level adjusting potentiometer 44 connected between the power supply 26 and ground. Also connected to the tap 42 is a rheostat 45 connected in series with a keyer switch 46 to ground. The keyer switch 46 may be of the breaker type suitable for operation by a rotatable member such as the shaft 17. An emitter biasing resistance 47 is connected from the emitter **25*e*** to ground. The construction of the transmitter so far described is claimed in my co-pending application filed on even date herewith and titled, "Facsimile Transmitter."

The output of the transmitter amplifier and filter 40 is connected to a receiver 50 by a wire line 51 or other suitable means and applied to a receiver amplifier 52 which includes automatic gain control as is well known in the art. The output of the receiver amplifier 52 is connected in parallel with a recorder and phasing mechanism 54 and a phasing pulse separator 55 which produces an output pulse 56. The recorder includes the phasing mechanism as is well known in the art. A coupling transistor 57 having a base 57b, a collector 57c and an emitter 57e has its base 57b connected to the output of the pulse separator 55. The collector 57c is connected to a B+ supply 59. A biasing resistance 60 is connected from the emitter 57e to ground.

The output of the coupling transistor 57 is connected to a coincidence phasing control network 61 which includes back to back connected diodes 63 and 64. A capacitor 66 is connected from the junction of the two diodes 63 and 64 through a resistor 68 to a negative power supply 71. A resistor 69 is connected from the junction of the diodes 63 and 64 to ground. The midpoint between capacitor 66 and resistor 68 is connected through a resistor 70 and through a keyer switch 74 to ground. The keyer switch 74 may be of the breaker or commutator type adapted to be actuated in synchronism with a drum (not shown) of the recorder 54. The coincidence phasing control network is described and claimed in a co-pending application titled Facsimile Coincidence Phasing Control Circuit filed on even date herewith by John W. Smith, Serial No. 199,187.

The output of the coincidence network 61 as indicated at 75 is connected to a monostable or one shot multivibrator 76 which feeds a phasing control and lock-out 77 which may be of any suitable type well known in the art. The output of the pulse separator 55 is connected to an enabling circuit 80 which effects starting of the recorder and phasing mechanism 54 and provides a holding potential for the lock-out of the phasing control 77. The enabling circuit is connected to the phasing control and lock-out as indicated at 81.

In the transmitter 1 and connected to the base 24b of the transistor 24 is a resistor 84 and a capacitor 85 connected in series and to ground. In an operative system a typical value of the resistor 84 is about 1.5 to 2.0 megohms, and the capacitor 85 may be 0.5 to 1.0 mfd. These values are chosen in order to produce a delay in the transmission of the video signals to the receiver 50. Alternatively, a relay or timed switch control might be used in circuitry which would suppress video signals but pass phasing pulses into the transmitter output for a similar time interval.

In the operation of the system the copy 7 is inserted between the belt 6 and the scanning plate 4 being moved by the belt 6 past the scanning area 5. Light from the source 2 is reflected from the surface of the copy 7 and collected by a suitable lens 11 to be focussed on the linear light transmitting slit 12. By the rotation of the disc 15 the optical window sweeps across the image as the disc 15 is rotated. The dissected image is directed by the lens 19 to the photosensitive surface 20 of the photocell 21.

The output of the photocell 21 is connected to the transistor 24. In the circuitry used the phototube current is at a maximum when white elemental areas of the copy are being scanned and at a minimum when black elemental areas are scanned. The transistor 24 is normally biased into conduction, the bias being opposed by the photocell current. Thus the output of the cascade connected transistors 24 and 25 is increased when the light to the photocell 2 is reduced as when received from the black elemental area of the copy. The output of the transistor 25 is applied to the modulator 28 at its midpoint 29. The operation of the modulator 28 is well known in the art, the video signal current driving the modulator to produce an amplitude modulated carrier output. The tap 42 of the potentiometer 44 may be adjusted to obtain a desired carrier level corresponding to white video signal.

In order to provide the backstroke interval the spiral 16 is made less than 360 degrees by shortening one of the ends thereof by an angular portion of 10 to 20 degrees. During the backstroke interval the blockage of light by the portion of the disc 15 between the ends of the spiral 16 results in the production of a full black video signal of uniform duration. During the backstroke interval the modulated output is increased in magnitude above that due to black level video signal by the circuitry associated with the keying switch 46. The keyer switch 46, when closed to ground, produces a so-called "blacker than black" pulse during the backstroke interval by causing the modulator 28 to be driven at a higher output level. Rheostat 45 is adjustable to achieve the desired magnitude of the blacker than black pulse. The emitter resistance 47 of the transistor 25 has a stabilizing effect in coordination with the setting of the potentiometer 44 to obtain the desired carrier level. In the amplifier and filter 40 the output carrier signal is amplified to the desired amount and passed through a vestigial sideband filter to reduce the bandwidth of the output signal which is transmitted to receiver 50.

In the receiver amplifier 52 the transmitted signal is amplified to a desired amount, the automatic gain control being provided to assure that a desired level of signal is applied to the recorder 54 and to the pulse separator 55. The pulse separator 55 provides control pulses which accomplish the dual purpose of actuating the enabling circuit 80 and of actuating the phasing control 77.

The output of the pulse separator 55 which is supplied to the enabling circuit 80 energizes a means which applies power to the recorder and phasing mechanism 54 to cause its drive motor to rotate and to operate the keyer switch 74. At the same time a holding potential is provided for the lock-out of the phasing control 77 which makes the phasing control ready to lock out the phasing mechanism upon coincidence of the transmitted and locally generated phasing pulses.

The output of the pulse separator 55 which is applied to actuate the phasing control 77 through the coincidence network 61 is used to drive the transistor 57 into conduction, the output of its emitter 57e being fed into the coincidence network 61 by being applied to the cathode side of diode 63. During the time that transmitted pulses are applied to the cathode side of diode 63 locally generated pulses are being produced during successive closures of the keyer switch 74 and are applied to the anode side of the diode 63.

In the event of coincidence between the pulse produced by the keyer switch 74 and the transmitted pulse applied to the diode 63, that is, when the pulses on both sides of the diode 63 are in coincidence, a pulse rise will occur at the gating diode 64 and is passed through the gate to trigger the one-shot multivibrator 76. In the event the locally generated and the transmitted pulses are not in coincidence the pulse rise is not produced at the diode 64 and the diode 64 is not made conductive.

When triggered the one-shot multivibrator 76 produces a controlled output pulse which actuates the phasing mechanism through the phasing control and lock-out 77.

Before the automatic gain control has established an operating level the receiver amplifier 52 will operate at excessive gain and thus produce an output signal to the pulse separator 55 in which both the video signals and the transmitted phasing pulses are of excessive amplitude. Thus the pulse separator 55 may produce false pulses resulting from the excessive amplitude of the video signals. Meanwhile, the light source 2 has not reached full intensity and thus a large full amplitude signal equivalent to a black video signal will be transmitted gradually decreasing in amplitude as the light reaches full intensity. The automatic gain control will reach an operating level in approximately one to two lines of scan but it may require between three and fifteen lines of scan for the light source to reach its full intensity. During this period it is quite possible that the excessive video pulses may cause the false output of the pulse separator 55 which will appear to the coincidence gate 61 as transmitted phasing pulses. In this case there may be an immediate operation of the phasing mechanism with lock-out thereof. In this event an improper condition of phasing may result, the recording being misframed and of course useless. This condition may continue during a whole series of recordings.

Figure 2:
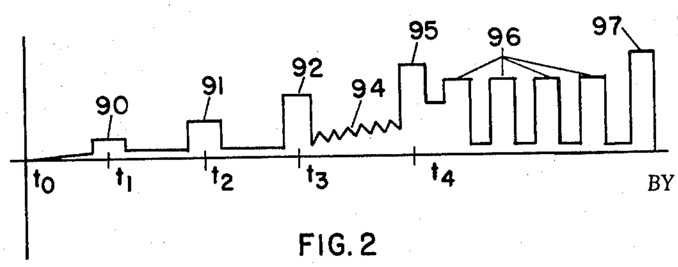
FIGURE 2 is a graph showing signals explaining the operation of the system shown in FIGURE 1.

In accordance with the invention automatic means is provided to block the transmitted video signal at the instant of start-up and to gradually allow the transmitted signal to build up to full magnitude. This result is achieved by the use of the time constant circuit including the resistor 84 and the capacitor 85. The action of this part of the circuitry will be observed by reference to FIGURE 2. The start of a transmission may be considered as being at $t_0$. At this time the capacitor 85 is fully discharged. The direct current output of the phototube 21 is at a minimum and thus the power supply 26 through the resistor 27 serves to charge the capacitor 85 through the resistance 84. The circuit values used for the time constant circuit are chosen so that the capacitor 85 becomes fully charged somewhat after the lamp 2 reaches full intensity. At a time $t_1$ the phasing pulse represented at 90 of reduced amplitude is the only output of the transmitter which is received and applied to the pulse separator 55. At later times $t_2$ and $t_3$ the output signals of the transmitter will be respectively as represented at 91 and 92. The pulses 90, 91, and 92 are representative of the envelope of the carrier of the pulse amplitudes transmitted. As the automatic gain control establishes its operating level and as the light reaches its full intensity the transmitted video signal increases in magnitude as indicated generally at 94 in which the small peaks represent the tips of the video signal. Finally as indicated at 95 the phasing pulse and the train of video signals 96 have reached full amplitude and the series continues with another phasing pulse 97.

Thus, by the use of the structure in accordance with the invention at the start of operation the receiver receives only phasing pulses with which to provide a controlled level by the automatic gain control and these pulses are the sole means for actuation of the coincidence network 61.

While the invention has been described with reference to a specific embodiment thereof, it will be understood that other embodiments may be resorted to without departing frm the invention. Therefore, the form of the invention set out above should be considered as illustrative and not as limiting the scope of the following claims.

I claim:

1. A facsimile system including a transmitter and a recorder, the transmitter including means producing video signals and phasing pulses, the recorder including phasing means responsive to received phasing pulses, and lockout means responsive to phasing pulses thereby preventing operation of the phasing means, the transmitter including time constant control means for the video signal and phasing pulses rendering the lockout means ineffective for a predetermined interval depending upon the characteristics of said time constant control means.

2. A facsimile system including a transmitter and a recorder, the transmitter including means producing video signals and phasing pulses, the recorder including phasing means responsive to received phasing pulses, and lockout means responsive to phasing pulses thereby preventing operation of the phasing means, the transmitter including time constant attenuation means for the video signal and phasing pulses rendering the lockout means ineffective for a predetermined interval depending upon the characteristics of said time constant attenuation means.

3. A facsimile system comprising a transmitter, photoelectric means providing a video signal for the transmitter, a driver output stage for the photoelectric means, a source of carrier current, a modulator driven by the output stage and supplied with carrier current thereby producing a modulated carrier output, keyer means adapted to drive the modulator to produce transmitter phasing pulses of greater amplitude than said video signal, a receiver, a phasing pulse separator for the receiver to separate transmitted phasing pulses, a keyer for the receiver producing recorder phasing pulses, gate means responsive to coincidence of the transmitter and recorder pulses, a multivibrator controlled by the gate means, normally operative phasing means rendered inoperative by the multivibrator means, lockout means responsive to transmitter phasing pulses received from said phasing pulse separator and effective only when the phasing means has been rendered ineffective, and a time constant network connected to the photoelectric means output controlling the build up of modulated carrier in the transmitter output at the start of a transmission so that the signal to the receiver rises from a series of phasing pulses to a complete signal including video signal and phasing pulses whereby the receiver is phased initially by coincidence of the transmitted phasing pulses with the receiver phasing pulses.

4. A facsimile system comprising a transmitter, photoelectric means providing a video signal for the transmitter, a driver output stage for the photoelectric means, a source of carrier current, a modulator driven by the output stage and supplied with carrier current thereby producing a modulated carrier output, keyer means adapted to drive the modulator to produce transmitted phasing pulses of greater amplitude than said video signal, a receiver, enabling means for the receiver responsive to carrier, a phasing pulse separator for the receiver to separate transmitted phasing pulses, a keyer for the receiver producing recorder phasing pulses, the keyer set into operation by the enabling means, gate means responsive to coincidence of the transmitter and recorder pulses, lockout means responsive to transmitter phasing pulses received from said phasing pulse separator and effective only when the transmitter and recorder pulses are in coincidence, and a time constant network connected to the photoelectric means output controlling the build up of modulated carrier in the transmitter output at the start of a transmission so that the signal to the receiver rises from a series of phasing pulses to a complete signal including video signal and phasing pulses whereby the receiver is phased initially by coincidence of the transmitted phasing pulses with the receiver phasing pulses.

5. A facsimile system comprising a transmitter, photoelectric means providing a video signal for the transmitter, a driver output stage for the photoelectric means, a source of carrier current, a modulator driven by the output stage and supplied with carrier current thereby producing a modulated carrier output, keyer means adapted to drive the modulator to produce transmitted phasing pulses of greater amplitude than said video signal, a receiver, a phasing pulse separator for the receiver to separate transmitted phasing pulses, a keyer for the receiver producing recorder phasing pulses, gate means responsive to coincidence of the transmitter and recorder pulses, lockout means responsive to transmitter phasing pulses, received from said phasing pulse separator and effective only when the transmitter and recorder pulses are in coincidence, and a time constant network connected to the photoelectric means output controlling the build up of modulated carrier in the transmitter output at the start of a transmission so that the signal to the receiver rises from a series of phasing pulses to a complete signal including video signal and phasing pulses whereby the receiver is phased initially by coincidence of the transmitted phasing pulses with the receiver phasing pulses.

6. A facsimile system comprising a transmitter, photoelectric means providing a video signal for the transmitter, a driver output stage for the photoelectric means, a source of carrier current, a modulator driven by the output stage and supplied with carrier current thereby producing a modulated carrier output, keyer means adapted to drive the modulator to produce a transmitted phasing pulse of greater amplitude than said video signal, a receiver, enabling means for the receiver responsive to carrier, a phasing pulse separator for the receiver to separate transmitted phasing pulses, a keyer for the receiver producing a recorder phasing pulse, the keyer set into operation by the enabling means, gate means responsive to coincidence of the transmitter and recorder pulses, a multivibrator controlled by the gate means, phasing means rendered inoperative by the multivibrator means, lockout means responsive to transmitter phasing pulses received from said phasing pulse separator and effective only when the phasing means has been rendered ineffective, and a time constant network connected to the photoelectric means output controlling the build up of modulated carrier in the transmitter output at the start of a transmission so that the signal to the receiver rises from a series of phasing pulses to a complete signal including video signal and phasing pulses whereby the receiver is phased initially by coincidence of the transmitted phasing pulses with the receiver phasing pulses.

7. A facsimile system comprising a transmitter, photoelectric means providing a video signal for the transmitter, a driver output stage for the photoelectric means, a source of carrier current, a modulator driven by the output stage and supplied with carrier current thereby producing a modulated carrier output, keyer means adapted to drive the modulator to produce a transmitted phasing pulse of greater amplitude than said video signal, a receiver, enabling means for the receiver responsive to carrier, a phasing pulse separator for the receiver to separate transmitted phasing pulses, a keyer for the receiver producing a recorder phasing pulse, the keyer set into operation by the enabling means, gate means responsive to coincidence of the transmitter and recorder pulses, a multivibrator controlled by the gate means, phasing means rendered inoperative by the multivibrator means, lockout means responsive to transmitter phasing pulses received from said phasing pulse separator and effective only when the phasing means has been rendered ineffective, and a resistance-capacitance time constant network connected to the photoelectric meas output controlling the build up of modulated carrier in the transmitter output at the start of a transmission so that the signal to the receiver rises from a series of phasing pulses to a complete signal including video signal and phasing pulses whereby the receiver is phased initially by coincidence of the transmitted phasing pulses with the receiver phasing pulses.

8. A facsimile system comprising a transmitter, photoelectric means providing a video signal for the transmitter, a driver output stage for the photoelectric means, a source of carrier current, a modulator driven by the output stage and supplied with carrier current thereby producing a modulated carrier output, keyer means adapted to drive the modulator to produce transmitted phasing pulses of greater amplitude than said video signal, a receiver, a phasing pulse separator for the receiver to separate transmitted phasing pulses, a keyer for the receiver producing recorder phasing pulses, gate means responsive to coincidence of the transmitter and recorder pulses, and a time constant network connected to the photoelectric means output controlling the build up of modulated carrier in the transmitter output at the start of a transmission so that the signal to the receiver rises from a series of phasing pulses to a complete signal including video signal and phasing pulses whereby the receiver is phased initially by coincidence of the transmitted phasing pulses with the receiver phasing pulses.

References Cited by the Examiner

UNITED STATES PATENTS 2,824,902 2/58 Pollard ---------------- 178—6.6

DAVID G. REDINBAUGH, *Primary Examiner.*